United States Patent [19]
Roth

[11] Patent Number: 4,673,603
[45] Date of Patent: * Jun. 16, 1987

[54] FLOOR MAT MOUNTING SYSTEM

[75] Inventor: David W. Roth, Grosse Pte. Park, Mich.

[73] Assignee: The 2500 Corporation, Birmingham, Mich.

[*] Notice: The portion of the term of this patent subsequent to Nov. 30, 1999 has been disclaimed.

[21] Appl. No.: 669,255

[22] Filed: Nov. 5, 1984

Related U.S. Application Data

[63] Continuation of Ser. No. 444,986, Nov. 29, 1982, Pat. No. 4,481,240, Continuation-in-part of Ser. No. 131,262, Mar. 17, 1980, Pat. No. 4,361,610.

[51] Int. Cl.$^4$ .............................. B32B 3/06; B60J 9/00
[52] U.S. Cl. ...................................... 428/85; 296/1 F; 428/95; 428/100; 428/189; 428/192
[58] Field of Search ...................... 428/99, 100, 90, 91, 428/95, 189, 192, 85, 88; 296/1 F; 15/215–217, 238; D12/203; 4/582; 16/1

[56] References Cited

U.S. PATENT DOCUMENTS

| | | | |
|---|---|---|---|
| 3,488,081 | 1/1970 | Nolen | 296/1 F |
| 3,930,084 | 12/1975 | Shields | 296/1 F |
| 4,340,632 | 7/1982 | Robbins, Jr. | 428/99 |
| 4,361,610 | 11/1982 | Roth | 296/1 F |

Primary Examiner—Paul J. Thibodeau
Attorney, Agent, or Firm—Gifford, Groh, VanOphem, Sheridan, Sprinkle & Dolgorukov

[57] ABSTRACT

The specification discloses an improved floor mat mounting system which consists of a retaining means molded out of plastic or other similar materials which, in one of its embodiments, has one smooth surface adapted to be glued or otherwise fastened to the underside of a motor vehicle carpet floor mat to prevent movement upon the entry and exit of occupants of a motor vehicle.

In another modification, there is disclosed a retainer having bristles extending from both sides thereof, which is adapted to be used by itself, and be placed at various locations on the car carpet with the standard motor vehicle floor mat placed thereover to engage the bristles on one side of the retainer, with the bristles on the other side of the retainer engaging the motor vehicle carpet, thereby preventing movement of the carpet floor mat by persons entering and exiting the vehicle.

Regardless of which modification is used, the frictional engagement between the bristles on the bottom of the retainer and the motor vehicle carpet prevent movement of the carpet floor mat of the motor vehicle.

11 Claims, 11 Drawing Figures

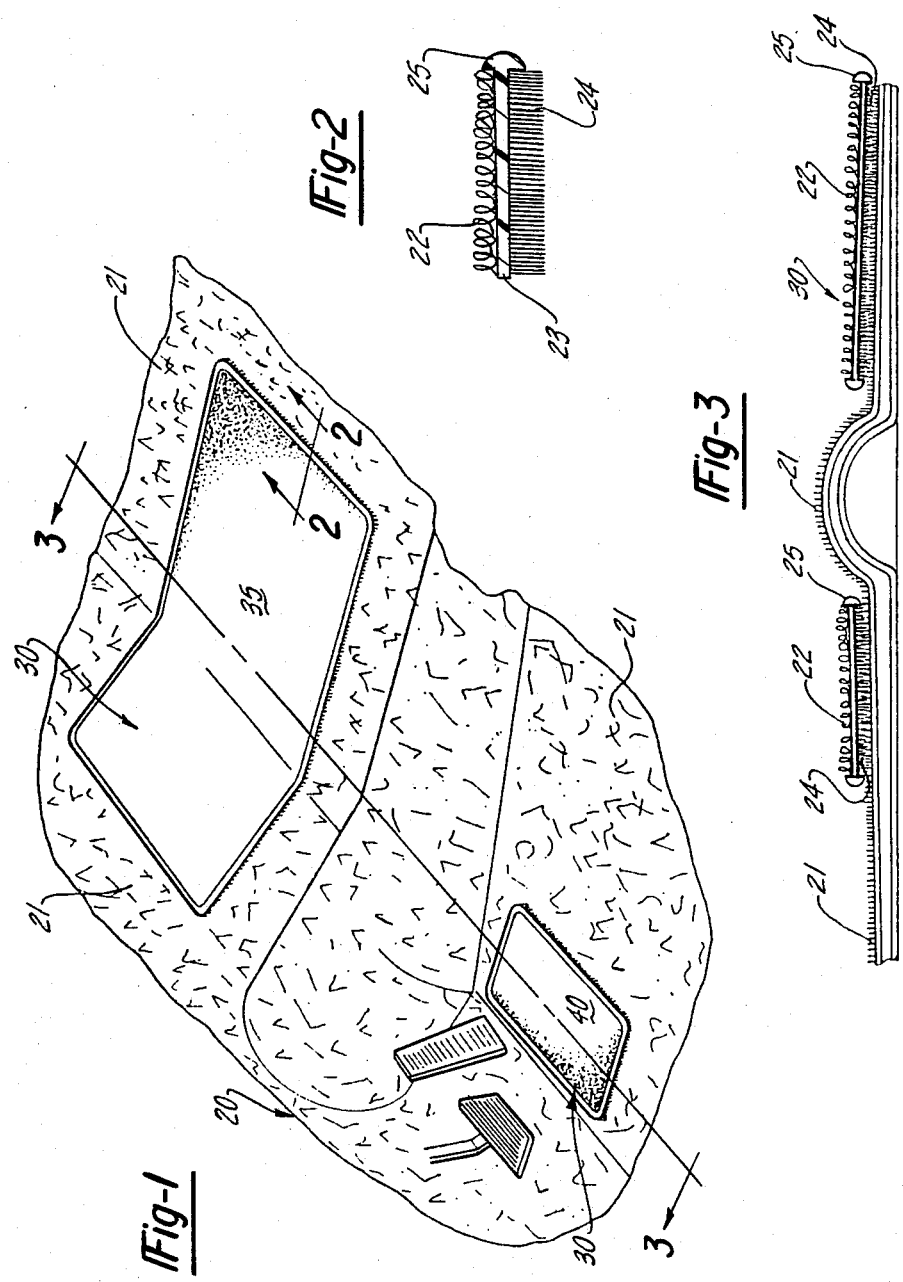

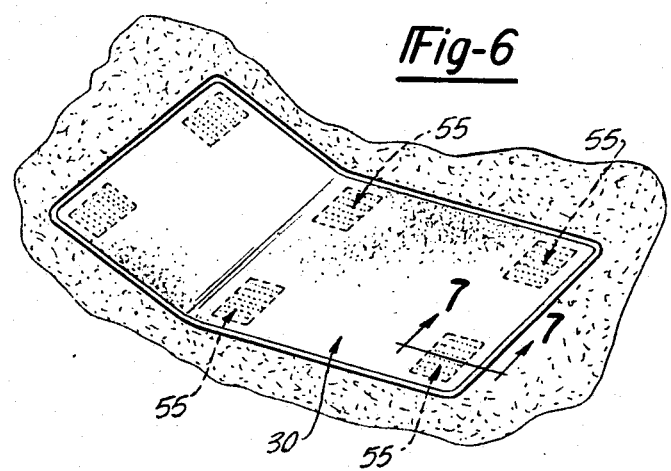
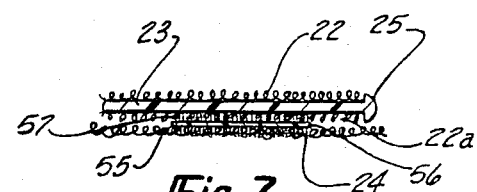
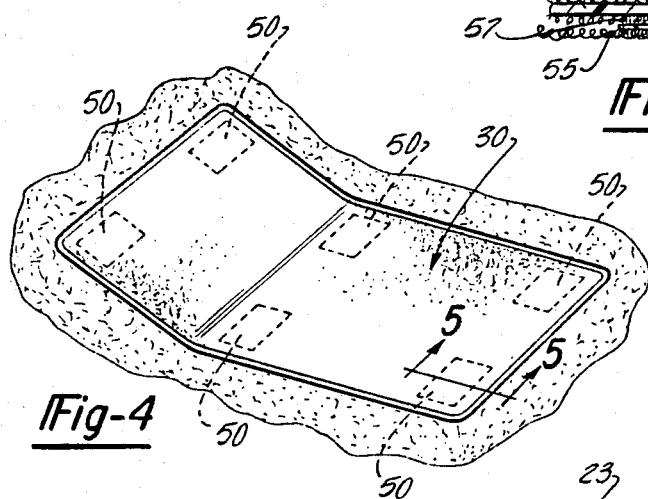
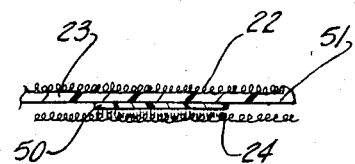

FLOOR MAT MOUNTING SYSTEM

The present application is a continuaton of my earlier filed co-pending U.S. patent application, Ser. No. 06/444,986, filed on Nov. 29, 1982, now U.S. Pat. No. 4,481,240, for an improved "Floor Mat Mounting System", which is a continuation-in-part of my earlier filed co-pending U.S. patent application, filed on Mar. 17, 1980, under Ser. No. 06/131,262, for a "Non-Skid Carpet Protector" now U.S. Pat. No. 4,361,610. Since the applicant in the present, and the aforementioned earlier applications are the same, and there is the necessary continuity of pendency present, the benefit of the filing date of said earlier co-pending applications is hereby requested.

The present invention relates to an improved floor mat mounting system, portions of which have been disclosed in said earlier co-pending application, Ser. No. 06/131,262, and the portions of said earlier application which are not repeated in the present application are specifically incorporated herein by reference.

The disclosed floor mat mounting system answers a long felt need for an economical and effective carpet protector which will remain in place during the entry and exit of occupants of a motor vehicle.

A review of the prior art will indicate that there are many patents which relate to the use of removable vehicle floor mats to protect the underlying carpet area, but to the best of my knowledge, none of these have had any commercial success or acceptability by retail consumers or the business community, nor have any of these carpet protectors solved the problems associated with movement during vehicle entry and exit.

Thus, one of the objects of the present invention is to provide a non-skid carpet protector which will remain in place during entry and exit by occupants of a motor vehicle.

A further object of the present invention is to provide a non-skid carpet protector which is easily removable and replaceable on the floor of a motor vehicle.

A further object of the present invention is to provide a non-skid carpet protector which is economical.

A further object of the present invention is to provide a non-skid carpet protector which is capable of being used on any carpeted surface.

Still another object of the present invention is to provide a non-skid carpet protector of a simple and practical construction, which is neat and attractive in appearance.

Another object of the present invention is to provide a non-skid carpet protector which is securely engaged to the underlying carpet by the application of a vertical pressure upon its horizontal surface.

Still another object of the present invention is to provide a non-skid carpet protector which can be made to any shape or size.

Further objects and advantages of this invention will be apparent from the following description and appended claims, reference being made to the accompanying drawings forming a part of this specification, wherein like reference characters designate corresponding parts in the several views.

BRIEF DESCRIPTION OF THE DRAWINGS

FIG. 1 is a perspective view showing the interior front floor of a motor vehicle on which is disposed a non-skid carpet protector embodying my present invention.

FIG. 2 is a partial cross sectional view of my non-skid carpet protector, taken in the direction of the arrows, along the section line 2—2 of FIG. 1.

FIG. 3 is a cross sectional view of the front motor vehicle compartment, taken in the direction of the arrows, along the secton line 3—3 of FIG. 1.

FIG. 4 is a perspective view showing a portion of the interior floor of a motor vehicle upon which is disposed a non-skid carpet protector embodying a modification of my invention.

FIG. 5 is a partial cross sectional view, taken in the direction of the arrows, along the section line 5—5 of FIG. 4.

FIG. 6 is a perspective view showing a portion of the interior floor of a motor vehicle upon which is disposed an improved floor mat mounting system embodying my present invention.

FIG. 7 is a partial cross sectional view of my improved floor mat mounting system, taken in the direction of the arrows, along the section line 7—7 of FIG. 6.

Figure 8:
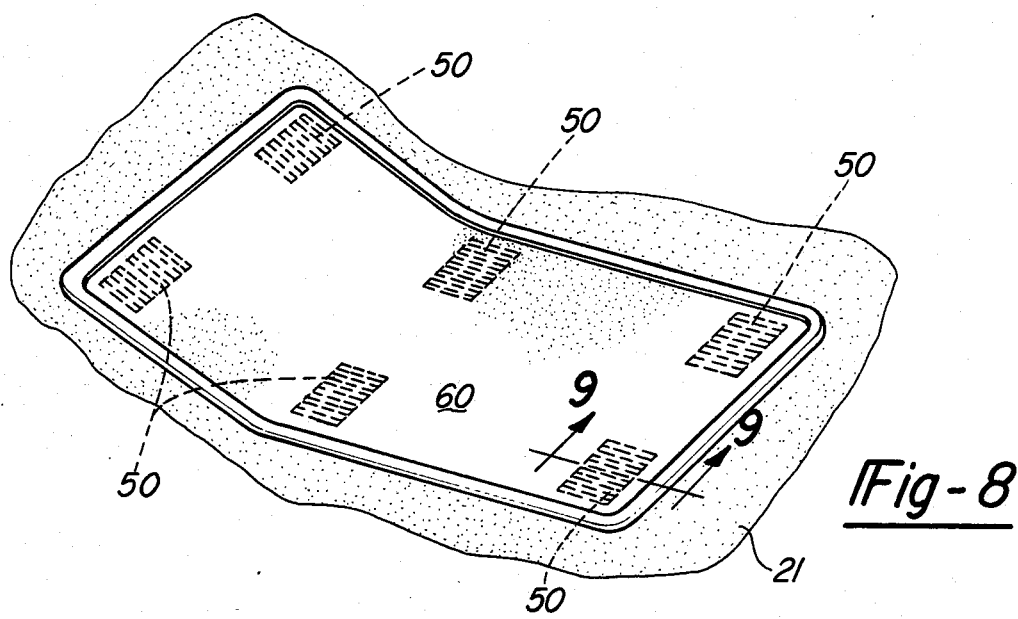
FIG. 8 is a perspective view showing a portion of the interior floor of a motor vehicle upon which is disposed a carpet protector composed of two pieces of carpet placed back-to-back, joined by a simple carpet edge binding, embodying a modification of my invention in which single-sided retaining devices are disposed thereon.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for purpose of description, and not of limitation.

DESCRIPTION OF THE PREFERRED EMBODIMENT

Referring to FIG. 1, there is shown a perspective view of an interior of a motor vehicle generally designated by numeral 20, upon which is disposed my non-skid carpet protector, generally designated by numeral 30.

The non-skid carpet protector 30 will remain securely in place during entry and exit by the vehicle occupants without the use of any screws, hooks or other mechanical securing means, due to the specially designed and improved features of my present invention which utilize stiff bristles 24 on the under side thereof, as can be best seen in FIGS. 2 and 3.

In FIG. 2, which is a cross sectional view of my non-skid carpet protector 30, there is disclosed what would appear at first glance to be a conventional-type carpeted floor mat with the carpet cover material 22 attached, by means well known in the art, to the carpet backing 23. However, on the bottom of the carpet backing 23, numerous stiff bristles 24 are permanently attached, also by means well known within the art of rug manufacturing. Such attaching means, of course, will vary depending on what carpet cover material, backing and bristles are used, but should be strong and water resistant.

Around the perimeter of the non-skid carpet protector 30 is placed a rivet-type edge treatment 25 which protects the exposed edges of both the carpet cover material 22, and the stiff bristles 24.

The spacing of the stiff bristles 24 should be such that the space between bristles is capable of accommodating the insertion of carpet cover material 22 between it in a frictional mesh-type arrangement which is best seen in FIG. 3. I have found that the best length for the stiff bristles 24 is no more than three-fourths of the average length of the carpet cover material, so that floatation, and resulting slippage, of the non-skid carpet protector 30 is prohibited.

While the stiff bristles 24 may be made from any kind of material, I have found the use of boar bristles or plastic to be extremely desirable since they can be obtained in several varieties of quality depending on the length, color and straightness of the bristle desired. The boar bristles are preferred on thinner carpets where extra gripping is needed, while plastic bristles are thought sufficient for thick carpets.

When plastic bristles are used, they may be formed integrally with the backing 23. Thus, it can be readily seen that upon the entry of a passenger into the motor vehicle, and the application of a vertical pressure upon the surface of the non-skid carpet protector 30, the stiff bristles 24 are placed in frictional contact with the fibers of the motor vehicle floor carpet 21 so that the displacement of non-skid carpet protector 30 in a horizontal direction is prohbited.

While I have described and shown my invention as being used in the front of a motor vehicle, it should be understood that it is well within the scope of the present invention that my device be used in either the front or rear of a motor vehicle, or be constructed to any shape or size necessary to protect the underlying carpet. Also, by the substitution of the carpet material 22, and/or the carpet backing 23 with other suitable matgerials, depending on the intended application, a protective device for many purposes is provided.

Referring now to FIGS. 4 and 5, there is shown a modification of my device wherein the stiff bristles do not have to cover the entire underside of the non-skid carpet protector, but are applied only to critical areas to prevent slipping of the motor vehicle floor mat and still provide a non-skid carpet protector 30, but in a much more economical fashion.

In this embodiment of my invention, in place of the entire underside of the backing 23 being covered with the stiff bristles 24, the bristles 24 are formed on a plurality of retaining devices 50 which are spaced around the perimeter of the non-skid carpet protector 30. The non-skid carpet protector 30, as before, consists of a carpet backing 23 to which there is mounted a carpet cover material 22 on the top thereof, which is attached by means well known in the art, to the carpet backing 23.

Around the perimeter of the carpet protector 30 can be provided a rivet-type edge treatment 25, or a half-rivet-type edge treatment 51, to protect the exposed edges of the carpet cover material 22. Also, a simple carpet binding well known in the art may also be used.

As before, it is well within the scope of this modification to use any practicable substrate including flexible substrate in place of the backing 23, depending on the use the protector 30 is intended for. Similarly, the carpet cover material 22 may be substituted by another material depending on the intended modification.

In this modification, the stiff bristles 24 which, as before, should be no more than three-fourths of the average length of the carpet cover material, are provided on the bottom of a plurality of retaining devices 50 spaced about the perimeter of the carpet protector 30. The preferred number of these devices, as shown in FIG. 4, is six, but any number may be used, depending on the application.

The retaining devices are permanently affixed to the carpet backing 23 by any suitable means, which may include mechanical means such as rivets, screws, etc., or glue-type means such as glue, cement, epoxy, etc. Any practicable means can be used as long as the retaining devices 50 are permanently attached. As before, the stiff bristles 24 may be made from any kind of material such as boar bristles or plastic, subject to the considerations mentioned hereinbefore.

A still further modification of my improved floor mat mounting system can be seen by referring to FIGS. 6 and 7. In this case, a dual-sided retaining device 55 is used in place of the retaining device 50. However, instead of being fastened to the carpet backing 23, they are merely placed about the perimeter thereof. This embodiment of my invention is to be used where the carpet protector 35 or 40 has an upper carpeted surface 22, as well as a lower carpeted surface 22A.

The dual-sided retaining devices 55 are spaced about the perimeter of the non-skid carpet protector 30 and, as shown, in the preferred embodiment for a motor vehicle, six of such devices are used. However, as before, it is well within the scope of the invention to use more or less of these dual-sided retaining devices 55, depending on the application to which the non-skid carpet protector is intended.

In this modification, the dual-sided retaining devices, generally designated by the numeral 55, have a planar surface 56 which generally divides a top bristled surface 57, from the lower bristled surface 24. The lower bristled surface 24 can consist of the same stiff bristles discussed in the previous modifications to the invention, while the upper bristled surface 57 consists of a plurality of bristles no longer than one-half to three-fourths of the length of the lower carpet cover material 22A. While the density of the lower carpet cover material 22A is generally the same as the carpet cover material on the top side of the non-skid carpet protector 30, which is designated, as before, with the numeral 22, this is not always the case. Also, it is preferable to have the density of the upper bristled surface 57 be from fifty percent to one hundred percent of the density of the lower carpet cover material 22A to have satisfactory operation of my device.

By having the upper bristled surface 57 of a length and density as described above, one effectively achieves the same result as with the modifications shown in FIGS. 4 and 5, with a type of carpet protector having carpet surfaces on both sides thereof.

It should be understood that, as before, this modification of my invention may be applied to various sizes of carpet protectors depending on the number of dual-sided retainers 55 which are used, whether on the floor mat 35 shown in FIG. 1, or on the heel-pad size construction 40, also shown in FIG. 1.

Figure 9:
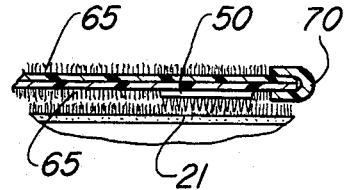
FIG. 9 is a partial cross-sectional view, taken in the direction of the arrows, along the section line 9—9 of FIG. 8.
Figure 10:
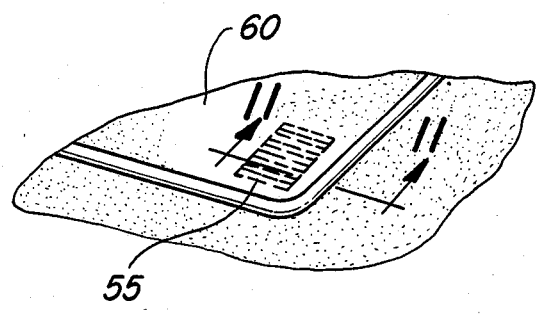
FIG. 10 is a perspective view showing a portion of the interior floor of a motor vehicle, upon which is disposed a carpet protector identical to that shown in FIG. 8, but showing a modification of my invention, in which dual-sided retaining devices are disposed thereon.
Figure 11:
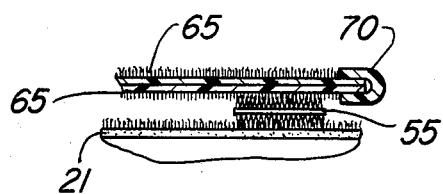
FIG. 11 is a partial cross-sectional view, taken in the direction of the arrows, along the section line 11—11 of FIG. 10.

Referring to FIGS. 8-11, if one desires to use a dual carpet protector 60 of the type which is in wide use today, which simply has two pieces of carpet 65 placed back-to-back, without carpet backing 23, and joined by a suitable edge binding 70, one may either mount my retaining device 50 directly to the bottom piece of carpet by any suitable means, as shown in FIG. 9, or use my dual-sided retaining device 55 after choosing the density and length of the upper bristled surface 57 and lower bristled surface 24. In this case, the dual-sided retaining device 55, like the retaining device 50, may be mounted to the lower piece of carpet by means previously described.

Thus, by abandoning previous constructions of carpet protectors, I have invented a protective device which is simple, practical, economical and attractive in appearance, and which solves the problem of movement of the carpet protector upon the entry and exit of the occupants from a motor vehicle.

I claim:

1. A flexible non-skid carpet protector adapted to be used on vehicle carpets, including, in combination, a carpet backing of a desired shape and cross section, a separate layer of a covering material of a complimentary shape attached to the top of said carpet backing, and a plurality of separate retaining devices, distinct from said carpet backing, and affixed about the perimeter of the underside of said carpet backing, said retaining devices having thereon a plurality of stiff bristles having a spacing sufficient therebetween to allow the insertion of a floor carpet material in a frictional mesh-type arrangement wherein said stiff bristles are of a length no more than three-fourths of the average length of carpet material on which said non-skid carpet protector is intended to be used.

2. The device defined in claim 1, and having six retaining devices affixed about the perimeter of said carpet backing.

3. The device defined in claim 2, and having rectangular retaining devices.

4. The device defined in claim 3, wherein said carpet protector is a mat construction.

5. The device defined in claim 3, wherein said carpet protector is a heel-pad construction.

6. The device defined in claim 3, wherein said carpet protector is adapted to cover the entire front floor area.

7. The device defined in any one of claims 1 and 2-6, wherein said bristles are boar bristles.

8. The device defined in any one of claims 1 and 2-6, wherein said bristles are plastic bristles.

9. The device defined in any one of claims 1 and 2-6, wherein said retaining devices are of one-piece construction.

10. The device defined in claim 1, wherein said retaining devices are of substantially the same area as said carpet backing.

11. The device defined in claim 10, wherein said retaining devices are formed integrally with said carpet backing.

* * * * *